March 14, 1933. G. H. DAVIES 1,900,899
ROTARY COUPLING FOR STEAM AND OTHER PRESSURE FLUID SUPPLY CIRCUITS
Filed Aug. 3, 1931
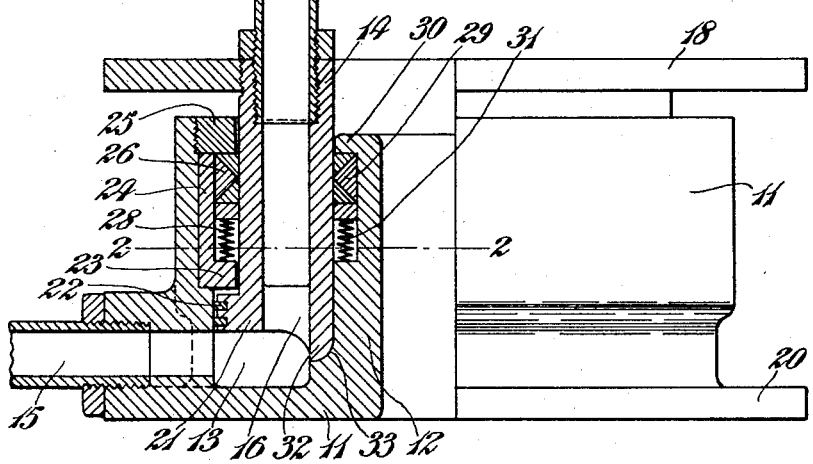
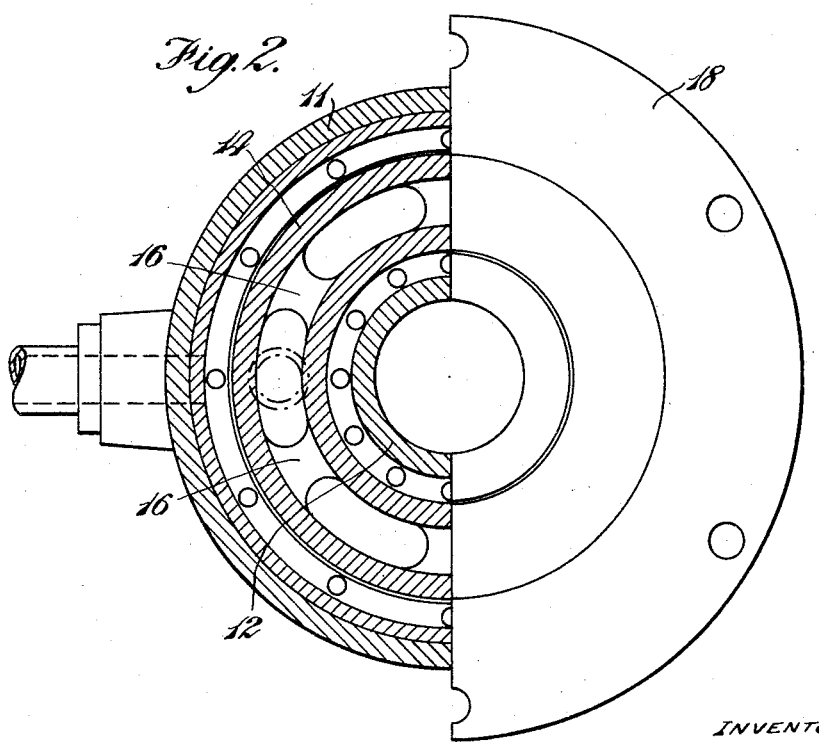
INVENTOR
G. H. Davies.
By Lacey & Lacey,
Attys.

Patented Mar. 14, 1933

1,900,899

UNITED STATES PATENT OFFICE

GILBERT HAROLD DAVIES, OF EBBW VALE, WALES

ROTARY COUPLING FOR STEAM AND OTHER PRESSURE FLUID SUPPLY CIRCUITS

Application filed August 3, 1931, Serial No. 554,932, and in Great Britain August 6, 1930.

This invention relates to couplings for use in steam, hydraulic or other pressure fluid supply circuits where it is required to couple a rotary part of a steam or other fluid circuit to a supply and/or delivery conduit. Such couplings are used, for instance, in steam-heated drying cylinders, calendering apparatus, brake systems, and in some forms of hoisting apparatus where it is necessary to couple a steam or hydraulic supply conduit to a rotary member, and as a rule this is effected by means of a hollow shaft rotating in a bearing and connected internally to the fluid supply circuit.

The object of the present invention is to provide an improved rotary coupling for use in pressure fluid circuits, which shall be capable of withstanding a considerable degree of pressure and yet be thoroughly reliable in use.

According to the invention, the improved coupling comprises two concentric cylindrical parts, one of which rotates axially relatively to the other a fluid receiving space being formed in the outer part and connected with a supply or delivery conduit, the inner part being pressed on a seating in the outer part by the pressure of fluid in said space, and being formed with a fluid conducting passage for connection with a delivery or supply conduit.

It is to be understood that the term "conduit" as used in the specification refers to any passage or chamber adapted to receive fluid; for instance, it may refer to the inlet or outlet end of a steam coil or the interior of a hollow cylinder.

A rotary coupling according to one form of the invention is illustrated by the accompanying drawing, of which:—

Figure 1 is a half sectional side elevation, and

Figure 2 is a half sectional plan view, the section being taken on the line 2—2 of Figure 1.

As shown, the coupling comprises an annular cylindrical outer body 11, the central portion 12 of which constitutes a bearing or fixing means adapted to receive a shaft. This outer annular body 11 is formed with a concentric chamber, indicated at 13, Figure 1, so that in radial section it is of substantially U-shaped form providing an annular chamber in which an annular concentric inner body 14 is fitted, so that the one body can rotate relatively to the other about their common axes. The depth of the inner body 14 is such that it does not extend completely to the bottom of the annular chamber 13 in the outer body 11. In the case illustrated a radially disposed conduit 15 in the outer body serves to convey the fluid to or from the space 13.

The inner annular body is hollow and is of substantially U-shaped formation in radial section so that it constitutes a further annular chamber for fluid. The lower edges of this body are, however, linked by webs, as indicated at 16, for the purpose of strength, whilst in the case illustrated an axially disposed conduit 17 communicates with the interior of said inner body 14.

The inner body 14 may serve as the hub of a hollow cylinder, shaft or the like, so that the fluid will pass through said body directly into said cylinder or shaft, or, alternatively, said body can be formed, as shown in the drawing, with a flanged upper end 18 adapted to be bolted to a rotary member, or to a fixed member (not shown) if the outer annular body is connected to a rotary member; in the case illustrated the outer rotary body 11 is formed similarly with a flange, indicated at 20.

It is to be observed that for each of the annular bodies 11 and 14, more than one conduit, such as those indicated at 15 and 17, may be provided in cases where this is desirable.

For obtaining a fluid-tight coupling between the two bodies 11 and 14, the inner end 21 of the inner body 14 is formed with a flange 22 which constitutes an abutment adapted to engage with a flange 23 at the inner end of an annular bush or sleeve 24 fitted in the outer wall of the outer annular body 11, the inner annular body 14 being capable of a slight axial movement, so that the pressure of fluid in the space 13 causes said body 14 to move upwardly causing the flange 22 thereof to seat fluid-tight upon the flange 23 of the sleeve 24, which latter is retained in position by means of a ring 25 screwed into the upper end of said outer wall of the outer body 11.

Further, packing rings or glands 26 are interposed between the threaded ring 25 and a series of coiled compression springs 28 bearing against the upper surface of the flange 23 of the sleeve 24; a similar division of a gland 29 being made at the inner side of the inner body 14 by forming a flange 30 on the inner wall of the outer annular body 11 in substantially the same plane as the threaded ring 25, springs 31 serving to press the gland 29. As an additional precaution, piston rings 22a and 22b are mounted in the flange 22 of the inner body 14. For the purpose of assisting the easy rotation of the bodies 11 and 14 relatively to one another, the inner member 14 extends lower at its inner than at its outer wall, as indicated at 32, and engages with an annular ledge 33 formed in the base of the outer body 11, the engaging surfaces being preferably rounded as shown to provide easy bearing surfaces.

As an example of the use of a rotary coupling such as that just described, the outer annular body 11 is bolted through the medium of the flange 20 to the bogey carriage of a swivelling steam crane, the inner annular body 14 being fitted about the kingpole of the crane on the under side of the carriage.

In this case the coupling is capable of serving as a means for transmitting steam from the brake control valve of the crane to the actual brake cylinder.

What I claim is:—

1. A rotary coupling comprising a member having an annular chamber therein, a pressure fluid conduit communicating with said chamber, an annular hollow member rotatably seated in the annular chamber in the first-mentioned member, the interior of said hollow member being open at the inner side to the annular chamber and said member being closed at its outer side, a fluid pressure conduit extending through the closed side of said member to communicate with the interior thereof and said member being movable axially under pressure admitted to the annular chamber in the first-mentioned member, and means for limiting the axial movement of the hollow member, said limiting means forming a fluid-tight seat.

2. A rotary coupling comprising an outer member having an annular chamber therein, an inner annular hollow member rotatably seating in the annular chamber of the outer member, fluid pressure conduits communicating with the rotary member and with the chamber in the outer member respectively, and opposed surfaces on the two members forming a fluid-tight seat when the inner member is moved axially under pressure of the fluid admitted to the annular chamber in the outer member.

3. A rotary coupling comprising an outer member having an annular chamber therein, an inner annular hollow member rotatably seating in the annular chamber of the outer member, fluid pressure conduits communicating with the rotary member and with the chamber in the outer member respectively, and oppositely extending overlapping annular flanges on the two members forming a fluid-tight seat when the inner member is moved axially under pressure of the fluid admitted to the annular chamber in the outer member.

4. A rotary coupling comprising an outer member having an annular chamber therein, an inner annular hollow member rotatably seating in the annular chamber of the outer member, fluid pressure conduits communicating with the rotary member and with the chamber in the outer member respectively, oppositely extending overlapping annular flanges on the two members forming a fluid-tight seat when the inner member is moved axially under pressure of fluid admitted to the annular chamber in the outer member, and annular packing on the members at opposite sides of the flanges.

5. A rotary coupling comprising an outer member having an annular chamber therein and provided with an annular ledge on the inner wall of said chamber near the bottom of said wall, an inner hollow annular member seating rotatably in said chamber and having its inner wall extended below its outer wall and seating on said ledge, conduits communicating with the inner member and the chamber in the outer member respectively, and overlapping shoulders on opposed surfaces of the members to form a fluid-tight seat when the inner member is moved axially by pressure admitted to the annular chamber.

In testimony whereof I have hereunto signed my name.

GILBERT HAROLD DAVIES.